United States Patent
Chen et al.

(10) Patent No.: US 10,775,920 B2
(45) Date of Patent: Sep. 15, 2020

(54) DRIVER INTEGRATED CIRCUIT APPLYING IMAGE PROCESSING DRIVING METHOD AND TOUCH DISPLAY SYSTEM

(71) Applicant: HIMAX TECHNOLOGIES LIMITED, Tainan (TW)

(72) Inventors: Shing-Chia Chen, Tainan (TW); Yi-Long Yang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 354 days.

(21) Appl. No.: 15/077,918

(22) Filed: Mar. 23, 2016

(65) Prior Publication Data
US 2017/0277331 A1 Sep. 28, 2017

(51) Int. Cl.
*G06F 3/041* (2006.01)
*G09G 3/20* (2006.01)
*G06F 3/044* (2006.01)

(52) U.S. Cl.
CPC .......... *G06F 3/0416* (2013.01); *G09G 3/20* (2013.01); *G06F 3/044* (2013.01); *G09G 2320/0242* (2013.01); *G09G 2354/00* (2013.01)

(58) Field of Classification Search
CPC ............ G06F 3/0416; G09G 3/3406; G09G 2320/0242; G09G 2320/0626
See application file for complete search history.

(56) References Cited

U.S. PATENT DOCUMENTS

| 2011/0074737 A1* | 3/2011 | Hsieh | G06F 3/0412 345/175 |
| 2012/0281027 A1* | 11/2012 | Kim | G09G 3/3406 345/690 |
| 2013/0335309 A1* | 12/2013 | Kerofsky | G09G 3/3406 345/102 |
| 2014/0043281 A1 | 2/2014 | Kim | |

(Continued)

FOREIGN PATENT DOCUMENTS

| CN | 202258267 U | 5/2012 |
| CN | 103050108 A | 4/2013 |

(Continued)

OTHER PUBLICATIONS

English Translation of CN 104808957.*
English Translation of TW 201539409.*

*Primary Examiner* — Patrick N Edouard
*Assistant Examiner* — Eboni N Giles
(74) *Attorney, Agent, or Firm* — Winston Hsu

(57) ABSTRACT

A driving method of a touch display panel includes: selectively operating in a display mode and a touch detecting mode; when operating in the display mode during a first frame period, processing a first frame to generate an image processing indicator of a second frame for indicating an image processing level of the second frame; when operating in the touch detecting mode during the first frame period, generating a control signal when a touch is detected; wherein when the control signal is generated, processing the second frame according to an image processing indicator of the first frame for indicating an image processing level of the first frame when operating in the display mode during a second frame period, instead of using the image processing indicator of the second frame.

13 Claims, 5 Drawing Sheets

(56) References Cited

U.S. PATENT DOCUMENTS

| | | | |
|---|---|---|---|
| 2015/0301670 A1* | 10/2015 | Chiu | G06F 3/0487 |
| | | | 345/589 |
| 2016/0381255 A1* | 12/2016 | Huang | G06F 3/0488 |
| | | | 348/500 |
| 2017/0090646 A1* | 3/2017 | Li | G06F 3/0416 |
| 2017/0131893 A1* | 5/2017 | Zhou | G06F 3/04847 |
| 2017/0221450 A1* | 8/2017 | Kim | G06F 1/1637 |
| 2017/0277352 A1* | 9/2017 | Xu | G06F 1/3262 |

FOREIGN PATENT DOCUMENTS

| | | |
|---|---|---|
| CN | 104808957 A | 7/2015 |
| TW | 201539409 A | 10/2015 |

* cited by examiner

DRIVER INTEGRATED CIRCUIT APPLYING IMAGE PROCESSING DRIVING METHOD AND TOUCH DISPLAY SYSTEM

BACKGROUND OF THE INVENTION

1. Field of the Invention

The present invention relates to a driving method, and more particularly, to an image processing driving method, a driver integrated circuit (IC) applying the driving method, and a touch display system.

2. Description of the Prior Art

Smartphone users may deal with a situation that requires changing a displayed image to another image by touching and swiping the display panel. The image here is not limited to a picture; it can be anything which is displayed on the touch display panel such as a webpage or an app. During the process of changing a displayed image to another, a conventional smartphone will process the image shown on the display panel dynamically. This kind of transient image process may cause severe quantization loss, however. For example, assuming that the display panel shows an image having a particular gray gradient, and the user changes the image to a wholly black image, as the image processor enhances the image processing level dynamically to optimize the display, the higher image processing level will result in greater quantization loss. Therefore, the user may sense a distortion in the image during this transient process.

SUMMARY OF THE INVENTION

One of the objectives of the present invention is to provide an image processing driving method, a driver IC, and a touch display system to solve the aforementioned problem.

According to an embodiment of the present invention, a touch display system is disclosed, comprising: an image processing unit, and a touch detecting unit. The image processing circuit is arranged to process a first frame during a display period of a first frame period to generate an image processing indicator of a second frame for indicating an image processing level of the second frame, wherein the second frame is displayed immediately after the first frame period. The touch detecting circuit coupled to the image processing unit is arranged to generate a control signal to the image processing unit when a touch is detected by the touch detecting unit during a touch detecting period of the first frame period; wherein when the image processing unit receives the control signal generated by the touch detecting unit, the image processing unit processes the second frame during a display period of a second frame period according to an image processing indicator of the first frame for indicating an image processing level of the first frame, instead of using the image processing indicator of the second frame.

According to an embodiment of the present invention, a driver IC is disclosed, wherein the driver IC is arranged to selectively operate in a display mode and a touch detecting mode during a first frame period when the driver IC is coupled to a touch display panel. When the driver IC operates in the display mode during the first frame period, the driver IC processes a first frame to generate an image processing indicator of a second frame for indicating an image processing level of the second frame, and outputs the first frame to the touch display panel; when the driver IC operates in the touch detecting mode during the first frame period, a touch detecting circuit generates a control signal to the driver IC if a touch is detected by the touch detecting circuit during the first frame period; wherein when the driver IC receives the control signal generated by the touch detecting circuit, the driver IC processes the second frame according to an image processing indicator of the first frame for indicating an image processing level of the first frame when the driver IC operates in the display mode during a second frame period, instead of using the image processing indicator of the second frame.

According to an embodiment of the present invention, a driving method of a touch display panel is disclosed, comprising: selectively operating in a display mode and a touch detecting mode; when operating in the display mode during a first frame period, processing a first frame to generate an image processing indicator of a second frame for indicating an image processing level of the second frame; when operating in the touch detecting mode during the first frame period, generating a control signal if a touch is detected; wherein when the control signal is generated, processing the second frame according to an image processing indicator of the first frame for indicating an image processing level of the first frame when operating in the display mode during a second frame period, instead of using the image processing indicator of the second frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
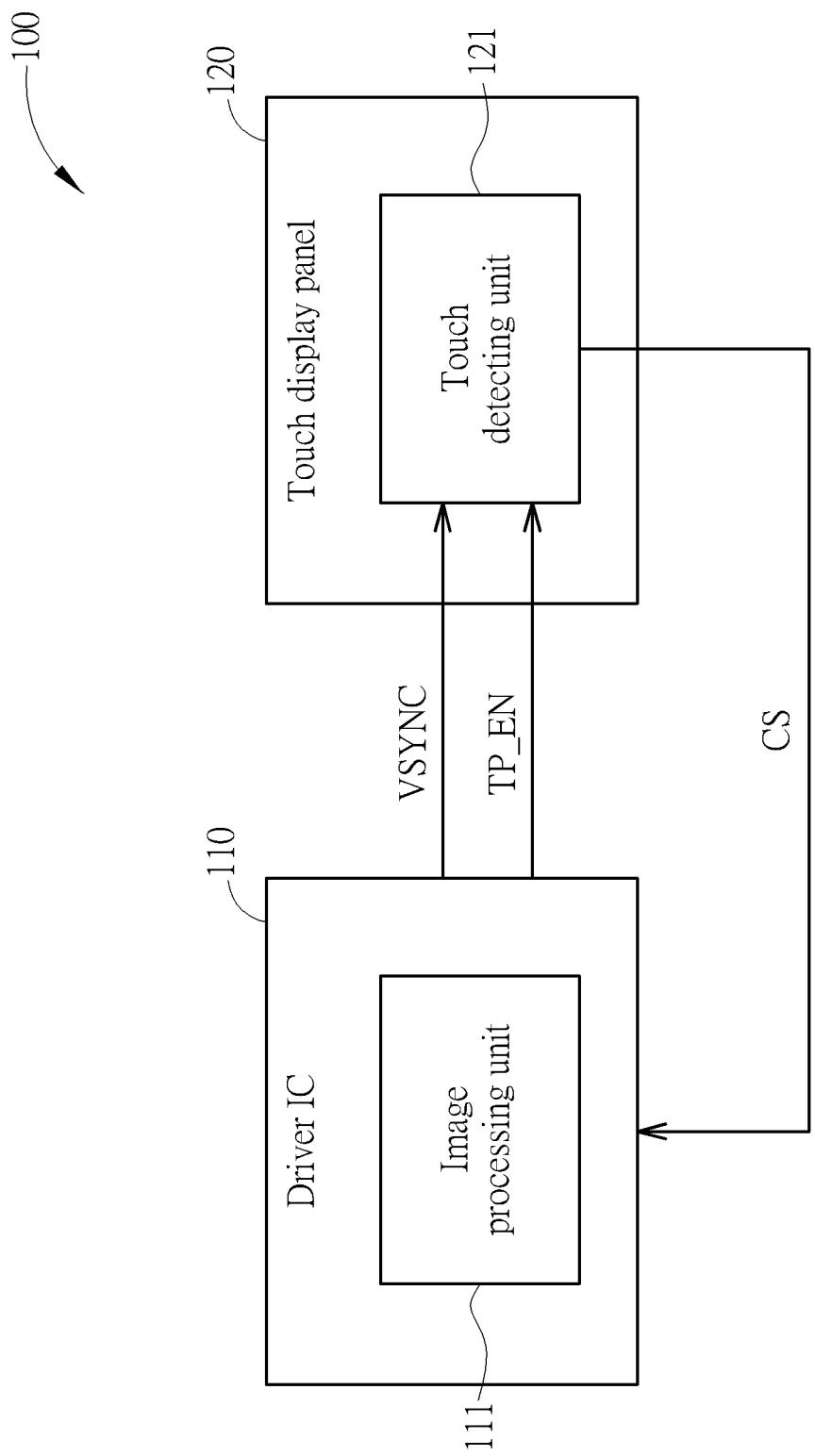
FIG. 1 is a diagram illustrating a touch display system according to an embodiment of the present invention.
Figure 2:
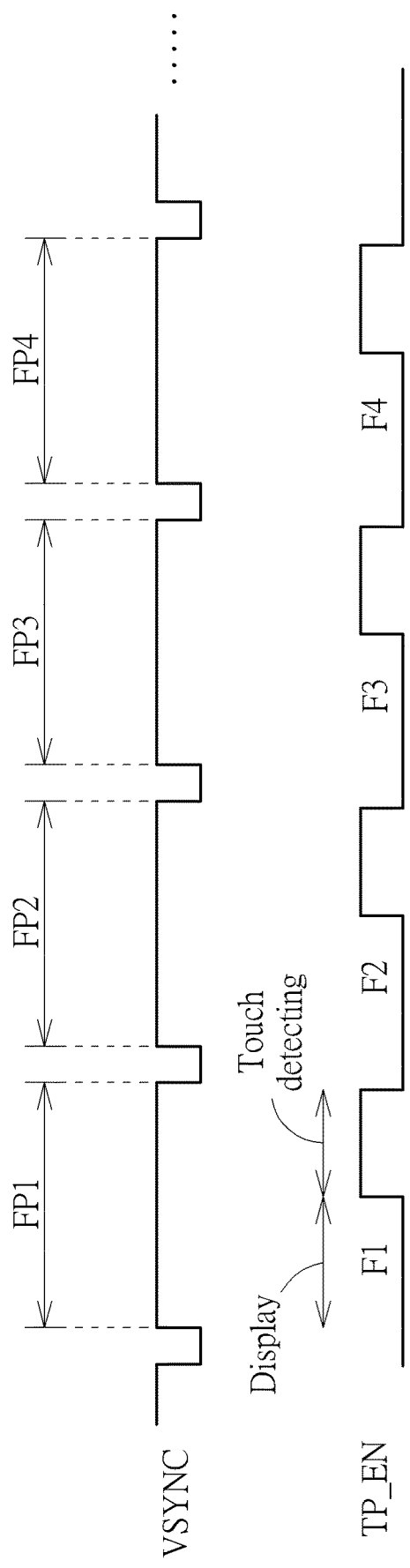
FIG. 2 is a diagram illustrating a synchronous signal and a touch enable signal according to an embodiment of the present invention.

FIG. 1 is a diagram illustrating a touch display system 100 according to an embodiment of the present invention. As shown in FIG. 1, the touch display system 100 comprises a driver IC 110 and a touch display panel 120, wherein the driver IC 110 comprises an image processing unit 111, and the touch display panel comprises a touch detecting unit 121. The driver IC 110 generates a synchronous signal VSYNC and a touch enable signal TP_EN to the touch display panel 120, wherein the synchronous signal VSYNC is arranged to define a time period for each frame, and the touch enable signal TP_EN is arranged to indicate whether the driver IC operates in a touch detecting mode or in a display mode during a frame period. Referring to FIG. 2, which is a diagram illustrating a synchronous signal VSYNC and a touch enable signal TP_EN according to an embodiment of the present invention, the synchronous signal VSYNC defines the time period for each frame, e.g. frame periods FP1-FP4. During the frame period FP1, the touch display system 100 processes and displays the frame F1; during a frame period FP2, the touch display 100 processes and displays the frame F2, and so on. The driver IC 110 can selectively operate in the display mode and the touch detecting mode during each frame period. As shown in FIG. 2, during the frame period FP1, the driver IC 110 operates in the display mode when the touch enable signal TP_EN stays low (i.e. logic value '0') and operates in the touch detecting mode when the touch enable signal TP_EN goes high (i.e. logic value '1'). Likewise, during the frame period FP2, the driver IC 110 operates in the display mode when the touch enable signal TP_EN stays low and operates in the touch detecting mode when the touch enable signal TP_EN goes high.

Referring again to FIG. 1, the image processing unit 111 is arranged to process display data of each frame when the driver IC 110 operates in the display mode, and generate an image processing indicator K for the next frame, wherein the image processing indicator K is for indicating an image processing level. For example, while the image processing unit 111 processes a frame F1 based on an image processing indicator $K_1$ when the driver IC 110 operates in the display mode in a frame period FP1 defined by the synchronous signal VSYNC, the image processing unit 111 generates an image processing indicator $K_2$ for a frame F2 such that the image processing unit 111 could process the frame F2 based on the image processing indicator $K_2$ when the driver IC operates in the display mode in a frame period FP2 defined by the synchronous signal VSYNC. In this embodiment, the image processing level indicated by the image processing indicator is a backlight compensation level, but this is not a limitation of the present invention; the image processing level can represent any image processing operation such as luminance/color enhancement and/or luminance/color compensation. The touch detecting unit 121 is arranged to send a control signal CS to the driver IC 110 if a touch is detected by the touch detecting unit 121 when the driver IC 110 operates in the touch detecting mode. It should be noted that the touch detecting unit 121 is not limited to be integrated in the touch display panel 120. In other embodiments, the touch detecting unit 121 can be integrated in the driver IC 110. When the driver IC 110 receives the control signal CS from the touch detecting unit 121, the image processing indicator for the next frame will be the same as the image processing indicator for the current frame. For example, while the image processing unit 111 processes the frame F1 based on the image processing indicator $K_1$ when the driver IC 110 operates in the display mode in the frame period FP1 defined by the synchronous signal VSYNC, the image processing unit 111 generates the image processing indicator $K_2$ for the frame F2. If the touch is detected by the touch detecting unit 121 when the driver IC 110 operates in the touch detecting mode in the frame period FP1, the image processing unit 111 controls the image processing indicator $K_2$ for the frame F2 to be the same as the image processing indicator $K_1$ for the frame F1. Next, when the driver IC 110 operates in the display mode in the frame period FP2, the image processing unit 111 processes the frame F2 based on the image processing indicator $K_2$ which is identical to the image processing indicator $K_1$.

Figure 3:
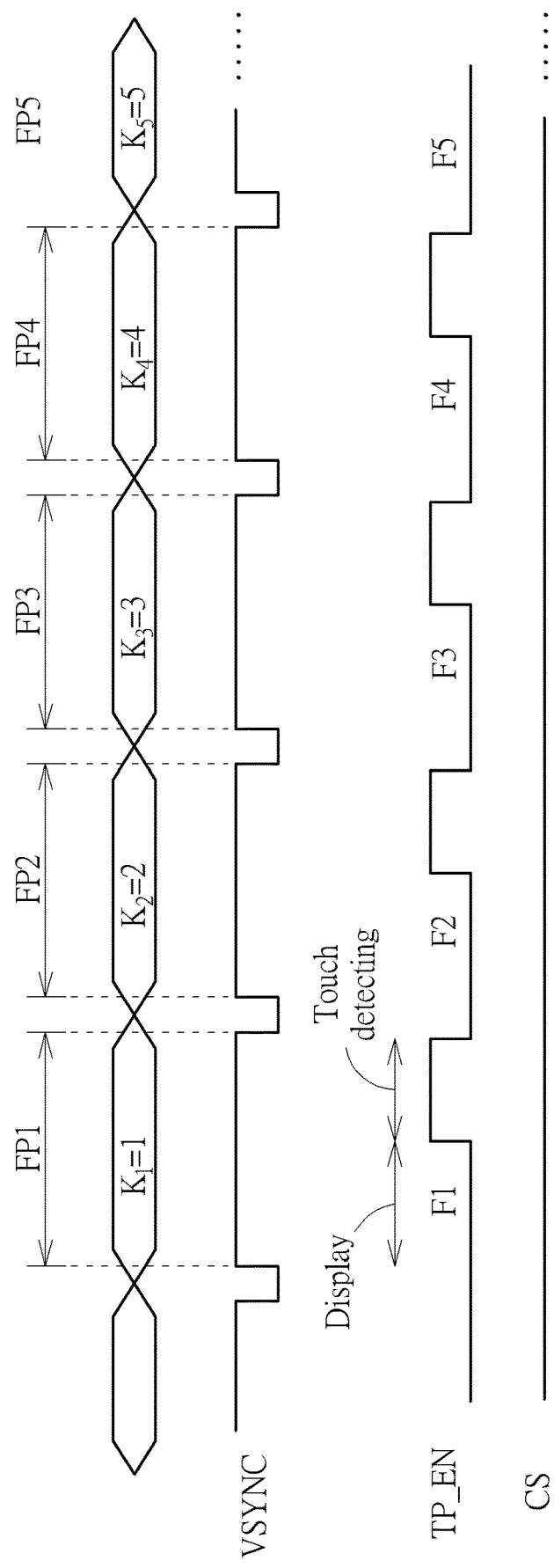
FIG. 3 is a diagram illustrating image processing indicators for frames when no touch is detected during a touch detecting period according to an embodiment of the present invention.

FIG. 3 is a diagram illustrating image processing indicators for frames when no touch is detected during a touch detecting period according to an embodiment of the present invention. As shown in FIG. 3, the control signal CS stays low (i.e. logic value '0') during frame period FP1 to frame period FP4, meaning there is no touch detected during frame period FP1 to frame period FP4. The image processing indicators for frames F1 to F5 may change from frame to frame. More specifically, when the driver IC 110 operates in the display mode in the frame period FP1, the image processing unit 111 processes the frame F1 according to the image processing indicator $K_1$, and the image processing unit 111 generates the image processing indicator $K_2$ for the frame F2 according to the contents of the frame F1, and/or the image processing indicator $K_1$, and/or other information. For example, the image processing indicator $K_1=1$ and the image processing indicator $K_2=2$, wherein the numbers 1 and 2 mean a level of image processing. The numbers are only for illustrative purpose, and are not a limitation of the present invention. The touch detecting unit 121 detects no touch when the driver IC 110 operates in the touch detecting mode in the frame period FP1. When the driver IC 110 operates in the display mode in the frame period FP2, the image processing unit 111 processes the frame F2 according to the image processing indicator $K_2$, and the image processing unit 111 generates the image processing indicator $K_3$ for the frame F3 according to the contents of the frame F1, and/or the image processing indicator $K_2$, and/or other information; for example, the image processing indicator $K_3=3$. The touch detecting unit 121 detects no touch when the driver IC operates in the touch detecting mode during the frame period FP2. The operation will therefore continue until a touch is detected by the touch detecting unit 121.

Figure 4:
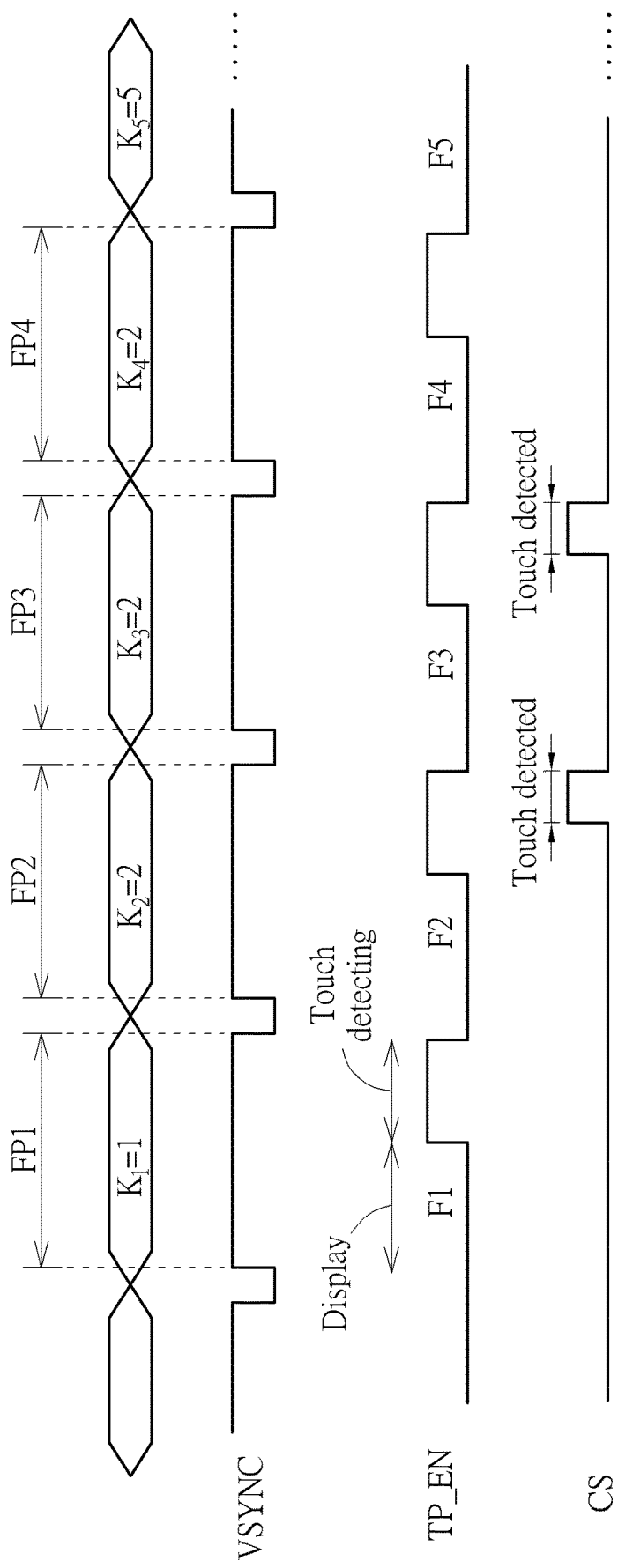
FIG. 4 is a diagram illustrating image processing indicators for frames when a touch is detected during a touch detecting period according to an embodiment of the present invention.

FIG. 4 is a diagram illustrating the operation when a touch is detected according to an embodiment of the present invention. As shown in FIG. 4, the control signal CS goes high when the driver IC 110 operates in the touch detecting mode during the frame periods FP2 and FP3, meaning a touch is detected by the touch detecting unit 121 during the frame periods FP2 and FP3. More specifically, when the driver IC 110 operates in the display mode during the frame period FP1, the image processing unit 111 processes the frame F1 according to the image processing indicator $K_1$, and the image processing unit 111 generates the image processing indicator $K_2$ for the frame F2. For example, the image processing indicator $K_1=1$ and the image processing indicator $K_2=2$. Next, the touch detecting unit 121 detects no touch when the driver IC operates in the touch detecting mode during the frame period FP1. Next, when the driver IC 110 operates in the display mode during the frame period FP2, the image processing unit 111 processes the frame F2 according to the image processing indicator K2, and generates the image processing indicator $K_3$ for the frame F3; for example, $K_3=3$. Because a touch is detected by the touch detecting unit 121 when the driver IC 110 operates in the touch detecting mode during the frame period FP2, the image processing unit 111 controls/resets the image processing indicator $K_3$ to be the same as the image processing indicator $K_2$, i.e. the image processing indicator $K_3$ is 2.

Next, when the driver IC 110 operates in the display mode during the frame period FP3, the image processing unit 111 processes the frame F3 according to the image processing indicator $K_3$ (which equals the image processing indicator $K_2$), and generates the image processing indicator $K_4$ for the frame F4. Then, because a touch is detected by the touch detecting unit 121 when the driver IC operates in the touch detecting mode during the frame period FP3, the image processing unit 111 also controls/resets the image processing indicator $K_4$ to be the same as the previous image processing indicator $K_3$, so $K_4$ will also be 2.

Next, when the driver IC 110 operates in the display mode during the frame period FP4, the image processing unit 111 processes the frame F4 according to the image processing indicator $K_4$ (which equals the image processing indicator $K_3$), and generates the image processing indicator $K_5$ for the frame F5. The image processing indicator may be different from the image processing indicator $K_4$ (for example, $K_5=5$) because the touch detecting unit 121 detects no touch when the driver IC operates in the touch detecting mode during the frame period FP4. In the end, when the driver IC 110 operates in the display mode during the frame period FP5, the image processing unit 111 processes the frame F5 according to the image processing indicator $K_5$.

Figure 5:
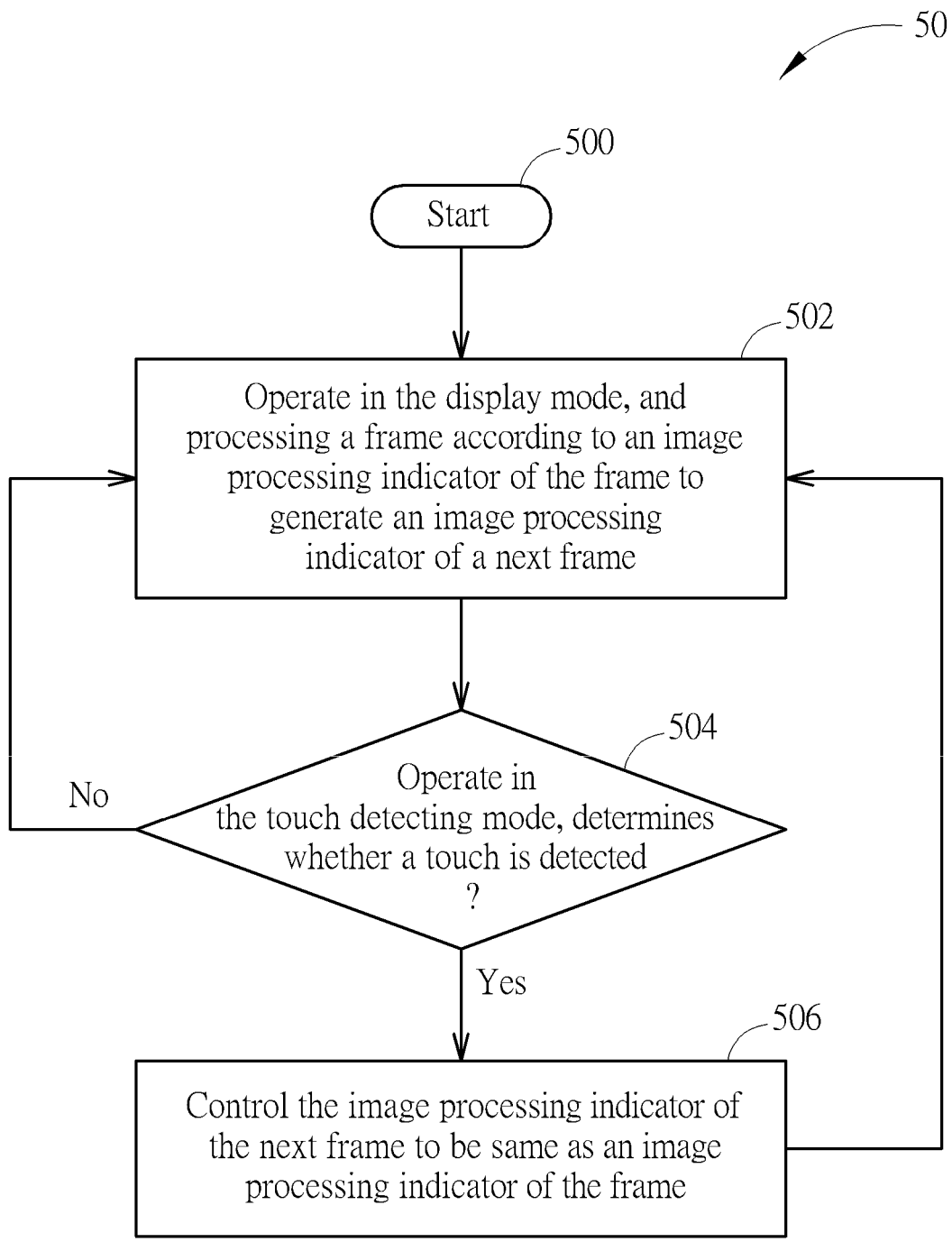
FIG. 5 is a flowchart illustrating a driving method of the touch display system according to an embodiment of the present invention.

FIG. 5 is a flowchart illustrating a driving method of the touch display system 100 according to an embodiment of the present invention. Provided that the result is substantially the same, the steps are not required to be executed in the exact order shown in FIG. 5. The exemplary driving flow of the touch display system 100 is briefly summarized by the following steps.

Step 500: start.

Step 502: the driver IC 110 operates in the display mode, and the image processing unit 111 processes a frame, e.g. the frame F1, according to an image processing indicator of the frame, e.g. the image processing indicator $K_1$, to generate an image processing indicator of a next frame, e.g. the image processing indicator $K_2$ of the frame F2.

Step 504: the driver IC 110 operates in the touch detecting mode, and determines whether a touch is detected by the touch detecting unit 121; if yes, go to step 506; otherwise, go to step 502.

Step 506: the driver IC 110 controls the image processing indicator of the next frame to be the same as the image processing indicator of the frame, i.e. $K_2=K_1$. The flow returns to step 502.

As a person skilled in the art can readily understand details of each step shown in FIG. 5 after reading the above paragraphs directed to the touch display system 100, further description is omitted here for brevity.

Briefly summarized, the present invention discloses an image processing driver method, a driver applying the method, and a touch display system to solve the problem of dynamically processing frames during a transient process between two images via keeping the image process still when a touch is detected, to thereby prevent an inconvenient experience for users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display system, comprising:
    an image processing unit, arranged to process a plurality of image frames, each image frame being processed according to an image processing indicator having a value indicating an image processing level of the image frame, wherein the image processing unit processes a first frame in a display period of a first frame period according to a first image processing indicator generated in a display period of a frame immediately before the first frame period, generates a second image processing indicator of a second frame in the display period of the first frame period, and processes the second frame in a display period of a second frame period according to the generated second image processing indicator, wherein the second frame period is immediately after the first frame period; and
    a touch detecting unit coupled to the image processing unit, arranged to generate a control signal to the image processing unit when a touch is detected by the touch detecting unit during a touch detecting period of the first frame period;
    wherein when the image processing unit receives the control signal generated by the touch detecting unit, the image processing unit controls the second image processing indicator to have a same value as the first image processing indicator, so that the second frame is processed according to a same image processing level as the first frame, and when the image processing unit does not receive the control signal, the image processing unit generates the second image processing indicator to have a value at least based on contents of the first frame.

2. The touch display system of claim 1, wherein the image processing level is a backlight compensation level.

3. The touch display system of claim 2, wherein when the touch is detected by the touch detecting unit during the touch detecting period of the first frame period, the brightness of a backlight module for the second frame period is determined to be the same as the brightness of the backlight module for the first frame period; and when there is no touch detected by the touch detecting unit during the touch detecting period of the first frame period, the brightness of the backlight module for the second frame period is generated according to a value of the image processing indicator of the second frame at least based on contents of the first frame.

4. The touch display system of claim 1, wherein the image processing level is a display quality optimization level.

5. A driver integrated circuit (IC), arranged to process a plurality of image frames, each image frame being processed according to an image processing indicator having a value indicating an image processing level of the image frame, wherein the driver IC is arranged to selectively operate in a display mode and a touch detecting mode during a first frame period of each image frame when the driver IC is coupled to a touch display panel, wherein when the driver IC operates in the display mode during a first frame period, the driver IC processes a first frame according to a first image processing indicator generated in a display period of a frame immediately before the first frame, generates a second image processing indicator of a second frame for indicating an image processing level of the second frame, and outputs the first frame to the touch display panel; when the driver IC operates in the touch detecting mode during the first frame period, a touch detecting circuit generates a control signal to the driver IC if a touch is detected by the touch detecting circuit during the first frame period; wherein when the driver IC receives the control signal generated by the touch detecting circuit, the driver IC controls the second image processing indicator to have a same value as the first image processing indicator, so that the second frame is processed in a second frame period according to a same image processing level as the first frame when the driver IC operates in the display mode during the second frame period, wherein the second frame period is immediately after the first frame period, and when the driver IC does not receive the control signal, the driver IC generates the second image processing indicator to have a value at least based on contents of the first frame.

6. The driver IC of claim 5, comprising:
an image processing circuit, arranged to process the first frame and the second frame when the driver IC operates in the display mode.

7. The driver IC of claim 6, further comprising:
the touch detecting circuit, arranged to generate the control signal when the touch is detected by the touch detecting circuit when the driver IC operates in the touch detecting mode.

8. The driver IC of claim 5, wherein the image processing level is a backlight compensation level.

9. The driver IC of claim 5, wherein when the touch is detected by the touch detecting circuit during the touch detecting period of the first frame period, the brightness of a backlight module for the second frame period is determined to be the same as the brightness of the backlight module for the first frame period; and when there is no touch detected by the touch detecting circuit during the touch detecting period of the first frame period, the brightness of the backlight module for the second frame period is generated according to a value of the image processing indicator of the second frame at least based on contents of the first frame.

10. The driver IC of claim 5, wherein the image processing level is a display quality optimization level.

11. A driving method of a touch display panel, comprising:
processing a plurality of image frames, each image frame being processed according to an image processing indicator having a value indicating an image processing level of the image frame, and selectively operating in a display mode and a touch detecting mode during a frame period of each image frame;
when operating in the display mode during a first frame period, processing a first frame according to a first image processing indicator generated in a display period of a frame immediately before the first frame, and generating a second image processing indicator of a second frame for indicating an image processing level of the second frame; and
when operating in the touch detecting mode during the first frame period, generating a control signal when a touch is detected;
wherein when the control signal is generated, controlling the second image processing indicator to have a same value as the first image processing indicator, so that the second frame is processed in a second frame period according to a same image processing level as the first frame when operating in the display mode during the second frame period, wherein the second frame period is immediately after the first frame period, and when the control signal is not generated, controlling the second image processing indicator to have a value at least based on contents of the first frame.

12. The driving method of claim 11, wherein the image processing level is a backlight compensation level.

13. The driving method of claim 11, wherein the image processing level is a display quality optimization level.

* * * * *